United States Patent [19]

Jones

[11] Patent Number: 4,616,523

[45] Date of Patent: Oct. 14, 1986

[54] BICYCLE BRAKE CABLE COUPLING MEANS

[76] Inventor: Stephen D. Jones, 421 W. Parkwood Ave., La Habra, Calif. 90631

[21] Appl. No.: 721,902

[22] Filed: Apr. 8, 1985

[51] Int. Cl.$^4$ ............................................... F16C 1/10
[52] U.S. Cl. ..................................... 74/501; 280/264; 280/279; 180/24.11
[58] Field of Search ............. 74/501 R, 502; 280/264, 280/279, 289 H; 180/24.11

[56] References Cited

U.S. PATENT DOCUMENTS 465,475  12/1891  Hardy ............................. 280/264 X
544,776   8/1895  Souder ............................ 280/264 X

FOREIGN PATENT DOCUMENTS 378775  10/1907  France ................................ 280/264

*Primary Examiner*—Harold W. Weakley
*Attorney, Agent, or Firm*—Harlan P. Huebner

[57] ABSTRACT

A brake cable coupling means for a rear wheel scissor hand brake activated by a cable which is pulled away from the brake to cause the scissoring against the rear wheel rim. The brake cable coupling means includes an inner rotatable member slidably mounted on the stem of the front fork of the bicycle and a separate cable portion extending to a hand brake handle mounted on the handle bar. An outer sleeve member surrounds the inner rotatable member with another cable portion secured thereto and extending to said brake. Alternatively bearing means may be interposed between the inner member and the outer sleeve or form a part of said outer sleeve. The inner sleeve member includes means to move said outer sleeve and said bearing means vertically upwardly therewith to activate said brake. The brake cable coupling means is activatable no matter what degree of rotation the front wheel of the bicycle is turned relative to the location of the respective cable portions.

9 Claims, 4 Drawing Figures

U.S. Patent  Oct. 14, 1986  4,616,523
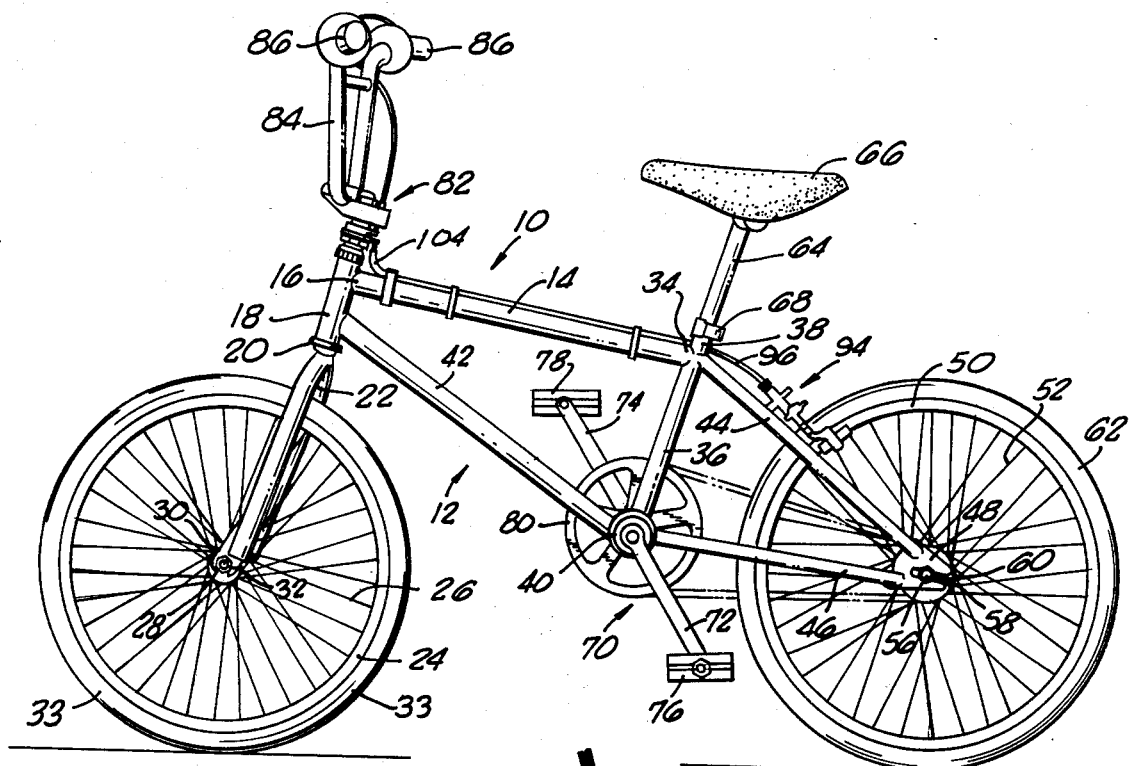
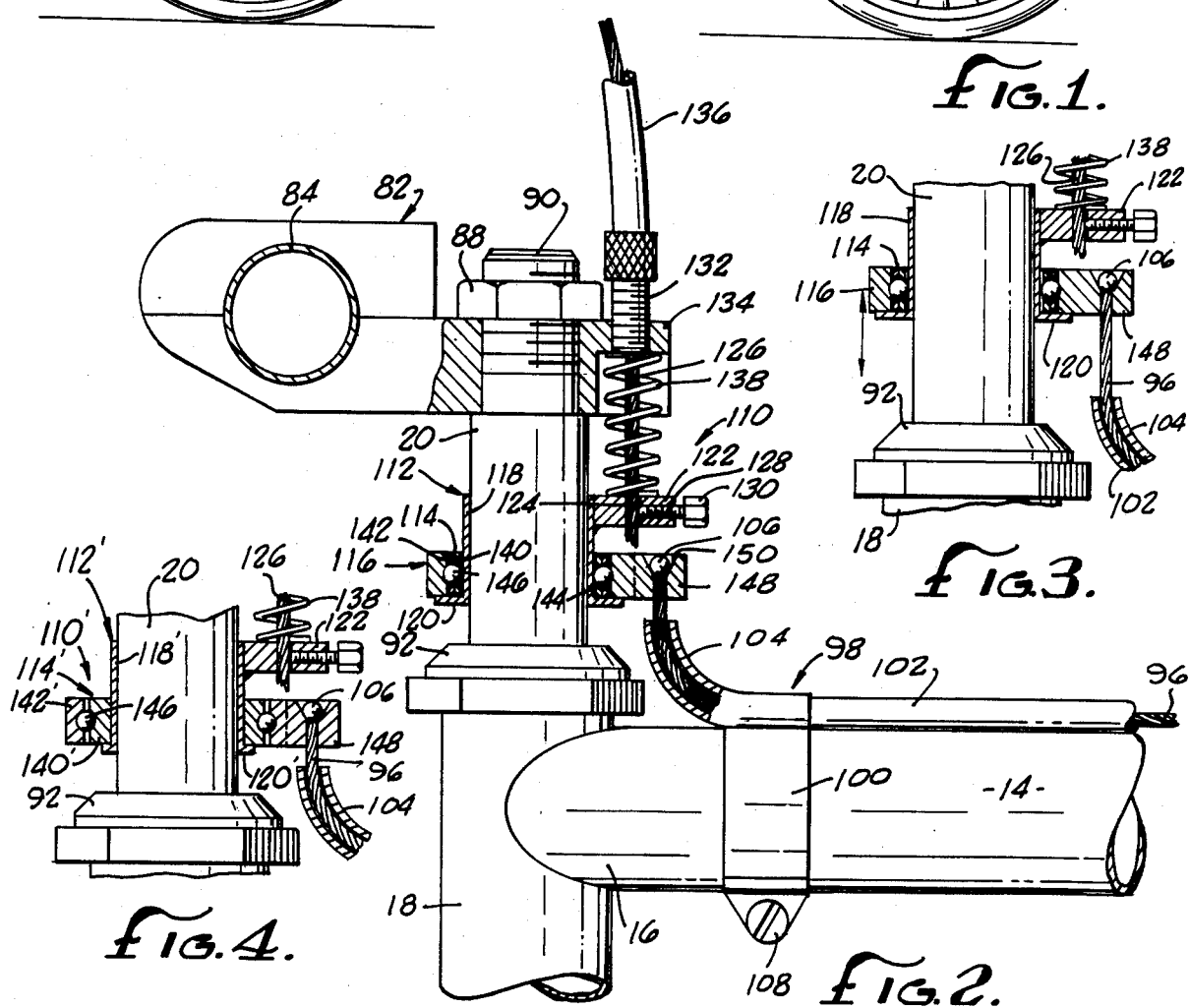

BICYCLE BRAKE CABLE COUPLING MEANS

BACKGROUND OF THE INVENTION

1. Field of the Invention

This invention relates to a bicycle brake cable coupling means to permit 360° or more rotation of the handle bar.

2. Description of the Prior Art

Initially bicycles were equiped with coaster brakes which were and are still used to brake the rear wheel of the bicycle.

Subsequently hand brakes were developed for use with bicycles. With the advent of hand brakes it was possible to apply brakes to both the front and rear wheel of the bicycle and thus assure complete stopping control. The hand brake generally utilizes a hand control or brake, mounted on the handle bar, which handle is attached to a cable extending to a pair of brake pads on opposite sides of the rear or front wheel. The brake pads are linked together by scissor links to squeeze the pads against the rim of the wheel and are spring actuated to release the pads on release of the hand control.

Up until the last few years the arrangement of the conventional hand brake with the cable extending from the handle bar down the bicycle fork to the front wheel or along the frame top bar to the rear wheel was satisfactory. The cable had sufficient play to allow the fork to be turned at an angle so the bicycle could turn corners However, with the advent of "free style" bicycling the need for greater versitility such as the necessity of being able to turn the fork and front wheel 360° became apparent. "Free Styling" is a form of bicycle acrobatics where the rider and his bicycle utilize a structure that has curved sides as might be found in a drained swimming pool or skatepark. The idea is to buildup speed so that the bicycle and rider shoot up the embankment into the air at which time the rider can engage in acrobatics which in some cases require that the front wheel be turned in a complete circle.

In order to utilize the rear brake, the cable as it moves down the stem of the handle bar and the fork of the bicycle is spaced therefrom to allow sufficient play so that on almost one 360° revolution the cable will not get completely wrapped up around the stem and fork. However, even with play in the cable the front wheel cannot be continued to be turned in 360° and beyond the cable will not bend and bind. Therefore, it is necessary to reverse the turn and unwind the cable.

SUMMARY OF THE INVENTION

It is the purpose of this invention to provide brake cable coupling means on the stem of the handle bar that will allow the handle bar, fork and front wheel of a bicycle to be turned in as many revolutions as desired without interference with activation of the rear brake or tightening of the brake cable around the stem.

Another object of this invention is to provide brake cable coupling means whereby the cable for breaking the rear wheel is in two pieces and no wrapping of the cable around the stem is possible.

Still a further object of this invention is to provide a collar fitted to the stem of the handle bar with apparatus to engage a first section of the rear brake cable, and a second collar means associated with the first collar independant therefrom with apparatus to engage a second section of the rear brake cable.

Another object of the invention is to provide means associated with the respective collar means to slide the collar means on the stem so that the rear brake may be activated to clamp brake pads to the wheel rim.

These and other objects and advantages will become apparent from the following part of the specification wherein details have been described for the competence of disclosure, without intending to limit the scope of the invention which is setforth in the appended claims.

BRIEF DESCRIPTION OF THE DRAWINGS

These advantages may be more clearly understood from the following detailed description and by reference to the drawings in which:

FIG. 1 is a side elevational view of a bicycle with the brake coupling means in place on the stem of the bicycle;

FIG. 2 is a side elevational view partly in cross section of the brake cable coupling means of the present invention in a rest or open position;

FIG. 3 is a partial view of the structure in FIG. 2 illustrating the means moved upwardly pulling the rear brake cable upward to apply the rear brake; and FIG. 4 is a modified brake cable coupling means.

DETAILED DESCRIPTION OF THE PREFERRED EMBODIMENT

In FIG. 1 there is illustrated a special type of bicycle structure for "free style" riding. The "free style" bicycle generally designated 10 includes a frame member generally designated 12 which is preferably constructed of light weight yet strong metal. The frame member 12 includes an upper top tube 14 joined at end 16 to a front post 18 to receive the stem 20 of a wheel fork 22. Mounted between the elements of the fork 22 is a wheel rim having spokes 26 secured to the axle 28. The axle is mounted to the bottom 30 of the forks 22 by means of nuts 32 on each side thereof. The rim 24 includes a tire 33.

The rear end 34 of the upper top tube 14 is secured to a to a upwardly extending seat post receiving tubular member 36 terminating in open end 38. The seat post receiving tubular member 36 extends downwardly and joins a pedal receiving sleeve 40. Extending between the pedal receiving sleeve 40 and the front post 18 is a frame lower tube 42.

Extending rearwardly from the seat post receiving member 36 is an upper forked rear tire frame member 44. Extending rearwardly from the pedal receiving sleeve 40 is a forked lower rear tire frame member 46. Both of the frame members 44 and 46 on each side terminate in axle receiving brackets 48.

Positioned between the axle receiving brackets 48 is a rear wheel rim 50 including spokes 52 secured to an axle not seen. The axle has a threaded stem 56 extending through a slot 58 in the axle receiving brackets 48 and a nut 60 on either side will secure the rim 50 into position. The rear rim 50 also includes a rear tire 62.

Mounted in the seat post receiving tubular member 36 is a seat post 64 secured to a bicycle seat 66. A nut 68 will allow adjustment of the bicycle seat post 64 up and down to the proper height.

In addition the bicycle 10 includes a pedal member 70 having pedal arms 72 and 74 on each side of the bicycle.

Secured to the end of the pedal arm are pedals 76 and 78. The pedal arms 70 and 74 are attached to a conventional axle which is mounted in the pedal receiving sleeve 40. On the right side of the bicycle, as seen in FIG. 1, there is a sprocket wheel 80 over which is placed a sprocket chain generally illustrated in ghost lines as seen in FIG. 1. The chain extends rearwardly to another sprocket wheel not seen so that conventionally as the pedals 72 and 78 are pumped and turned in the sleeve 40 the sprocket chain will engage the rear wheel frame 50 and cause movement of the bicycle.

Now turning to the front of the bicycle there is shown mounted on the stem 20 of the fork 22 a handle bar clamp 82. Secured within the handle bar clamp 82 is a handle bar 84. At the ends of the handle bar 84 hand grips 86 may be mounted thereon.

The handle bar clamp 82 is secured on the stem 20 by means of a height adjustment nut 88 at the top 90 of the stem 20.

In addition, at the top of the post 18 there is a head lock nut 92 surrounding the stem 20.

The rear tire rim hand brake generally designated 94 is mounted on the fork upper rear tire frame member 44. The tire rim brake 94 is a conventional type of brake which includes two portions one on each side of the rim which are attached to break pads. The unit operates on the scissor principle and there is a spring between the respective members to separate the members and the brake pads from the rear rim 50 when the brake is released. To apply the brake it is necessary to pull on the brake assembly 94 to scissor the brake pads against each side of the rear tire rim 50.

In order to accomplish the closing of the conventional brake 94 a cable 96 extends from the brake 94 along the top of the upper frame top tube 14 through a guide clamp generally designated 98, which included a clamp member 100 secured around the tube 14 and a sheathing 102 which has a front end 104 curved upwardly as best seen in FIG. 2. The cable 96 as seen is both FIGS. 2 and 3 extends through the sheathing 102 and exits at the top 104 of the sheathing 102. The cable at this point terminates in a stop ball 106. The cable clamp 100 is secured to the upper frame 14 by means of a bolt 108.

Mounted on the stem 20 is the brake cable coupling means generally designated 110. The brake cable coupling means 110 includes an inner sleeve member generally designated 112 slidable mounted on said stem 20. Surrounding the inner sleeve member 112 is a case sealed bearing ring 114 and bearing against the exterior of the bearing ring 114 is an outer sleeve member generally designated 116.

Referring now specifically to the inner sleeve member 112, the member includes a tubular elongated sleeve portion 118 having a bottom annular flange portion or contact means 120 extending outwardly from the elongated sleeve 118. Secured to the annular sleeve 118 at the top thereof, as best seen in FIGS. 2 and 3, is an upper cable holder tab 122. The tab is welded or otherwise secured to the exterior of the elongated sleeve 118. The tab holder 122 includes a bore 124 to receive an upper brake cable portion 126. Passing into the tab 122 is a threaded bore 128 to receive a set screw 130. The set screw 130 as can be seen is threaded into the bore 128 and will pinch against and hold the upper cable 126. The cable 126 extends upwardly through a cable fitting 132 which is threadably mounted in an extention tab 134 extending from the handle bar clamp 82. The fitting 132 receives a cable sheild sheathing 136 through which the cable 126 will extend to a brake handle, not seen, but mounted on the handle bar 84 of the bicycle 10.

In order to bias the sleeve 112 in a down position such as seen in FIG. 2 there is a biasing spring 138 of several convolutions which bear against the bottom part of the tab 134 and the upper tab 122 so that the sleeve 112 which is slidably mounted on the stem 20 can be moved up by squeezing the brake handle and be pressed downwardly by the spring 138 on release of the handle to the open or at rest position as shown in FIG. 2.

Mounted around the exterior of the inner sleeve 112 is the case seal bearing ring 114 which preferably is of the conventional type including an inner and outer ball race 140 and 142 forming a plurality of ball cages 144 to receive a ball bearings 146. As can be seen from the drawings the inside of the ball bearings will bear against the outer portion of the inner sleeve member 112 and will also extend outwardly and bear against the outer sleeve member 116. This outer sleeve member 116 is circular is shape and again as in the inner sleeve includes a lower cable holder tab 148. The tab 148 is formed with a bore extending therethrough and an upper "V" shaped opening 150 to receive the stop ball 106 of the rear brake cable 96.

In operation, when it is desired to apply the rear brake 94 the brake handle mounted on the handle bar 84 is squeezed which in turn will pull the upper cable 126 upwardly by biasing the spring 138 and simultaneously will raise the inner sleeve member 112 upwardly. As the inner sleeve member 112 is moved upwardly the bottom annular flange portion 120 bears against the case sealed bearing ring 114 and outer sleeve member 116 pulling them upwardly on the stem as well. As the outer sleeve 116 is moved upwardly the rear cable 96 will be pulled to the position such as seen in FIG. 3. This in turn will activate the scissor brake 94 so that the pads may engage the rim 50 and act as a brake.

The advantage of this type of brake cable coupling means is that the front wheel may be rotated in 360° or more without interferring with the brake mechanism. Thus, as the rider turns the handle bar 84 either to the right or left it may rotate 360° or more than one revolution if necessary due to the fact that the inner sleeve member 112 will rotate around the stem 20 whereby the outer rim 116 and ball bearing ring 114 may be maintained in a generally fixed position as seen in FIGS. 2 and 3. In this way it can be seen there is no interference between the braking mechanism nor would the cable that goes to the rear brake 94 be wrapped around the front post 18 or the stem 20. There is no impediment to the rotational movement of the fork 22, handle bar 84 and upper brake cable 126.

It can be seen that as the rider commences the acrobatics it may be necessary to apply the brake as he is starting into some of the acrobatic stunts but at the same time the front wheel may be desired to be turned to an appropriate angle. By doing this there is no interference whatsoever with the brake cable to the rear brake 94 in that the tab 122 of the inner ring, which is a part of the inner sleeve 112, does not require alignment with the tab 148 but may be engaged at any degree therearound the stem 20.

After the braking has been accomplished the brake handle on the handle bar 84 is released and the spring 138 will bias the brake cable coupling means 110 downwardly from the position of FIG. 3 to the position of FIG. 2 wherein the brake is fully released.

In FIG. 4 there is illustrated a modified brake cable coupling means 110'. In this configuration the inner sleeve 112' elongated sleeve 118' has the inner ball race 140' welded or otherwise secured thereto adjacent the annular flange 120'. The ring 114' includes plurality of ball bearings 146 and a freely rotatable outer ball race 142'. Mounted to the outer ball race 142 is the lower cable holder tab 148.

Thus in operation, the outer ball race 142' generally remains in a fixed position due to the position of the cable 96. When however the handle bar 84 is turned the sleeve 118' and inner ball race 140' will rotate with rotation of the stem 20 by the handle bar.

When the sleeve 118' is raised the entire case seal bearing ring 114' will be raised therewith as an intregal unit.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific form shown or uses mentioned, except as defined in the accompanying claims, wherein various portions have been separated for clarity of reading and not for emphesis.

I claim:

1. A brake cable coupling means for use with a hand brake for the rear wheel of a bicycle wherein said brake is a scissor type of brake adapted to be activated by movement of a rear brake cable by pressure on a hand brake handle mounted on a handle bar secured to a stem of a front wheel fork rotatably mounted in a front post of said bicycle, said handle and said brake being connected therebetween by a cable through said coupling means wherein said last means includes;
    an inner sleeve member slidably and rotatably mounted on said stem;
    an outer sleeve member mounted around said inner sleeve and adapted to be independent of the rotation of said inner sleeve member yet vertically slidably yieldable simultaniously with the sliding movement of said inner sleeve;
    said rear brake cable being formed into an upper portion and a lower rearwardly extending portion, said upper portion extending from said brake handle to said inner sleeve member, and said lower rearwardly extending portion extending from said outer sleeve to said rear brake; and
    said brake cable coupling activatable to apply said rear brake no matter what degree of rotation said front wheel of said bicycle assumes and said cable will not interfer with said front post and said cable application to said brake.

2. A brake cable means as defined in claim 1 wherein there is included;
    contact means on said inner sleeve to engage said outer sleeve for insuring slidable simultaneous movement therewith; and
    a bearing ring interposed between said inner and said outer sleeve members.

3. A brake cable coupling means as defined in claim 2 wherein said inner sleeve member is annular and extends around said stem of said front wheel fork, and
    said contact means on said inner sleeve includes an annular flange extending outward from said sleeve underlying at least a portion of said outer sleeve to engage the same for upward sliding movement when said hand brake handle is activated to urge said upper portion of said cable and said inner sleeve upwardly.

4. A brake cable coupling means as defined in claim 3 wherein there is included;
    spring means associated with said upper cable portion and said inner sleeve to urge said inner sleeve downward upon release of pressure on said hand brake handle.

5. A brake cable coupling means as defined in claim 1 wherein;
    said inner sleeve member includes an upper cable tab means struck outwardly of said sleeve member adapted to receive an end of said upper cable portion; and
    screw means to releasable hold said end in place.

6. A brake cable coupling means as defined in claim 1 wherein;
    said outer sleeve member includes a tab means struck outwardly of said outer sleeve member adapted to releasably receive an end of said lower rearwardly extending portion of said cable.

7. A brake cable coupling means as defined in claim 1 wherein;
    said outer sleeve portion will remain generally non-rotatably mounted about said inner sleeve member.

8. A brake cable coupling means as defined in claim 1 wherein;
    said outer sleeve is an outer ball race of a bearing ring and said ring also includes an inner ball race fixedly secured to said inner sleeve for rotation therewith, and said outer and inner ball races fitted with ball bearings whereby said inner ball race may rotate around said stem and said outer ball race may remain non-rotatable yet slidingly yieldable with said inner sleeve.

9. A brake cable coupling means for use with a hand brake for the rear wheel of a bicycle designed for performing acrobatics wherein said brake is activated by movement of a rear brake cable, said movement of said cable caused by pressure on a hand brake handle mounted on a handle bar secured to a stem of a front wheel fork capable of 360° or more unrestricted rotation within a front post of said bicycle, said handle and said brake being connected therebetween by a cable through said coupling means wherein said last means includes;
    an inner sleeve member slidably and rotatably mounted on said stem;
    a bearing ring surrounding said inner sleeve member and in contact therewith;
    an outer sleeve member mounted around and in contact with said bearing ring, said outer sleeve member being independent of the rotation of said inner sleeve member yet vertically yieldable with the sliding movement of said inner sleeve;
    contact means on said inner sleeve which includes an annular flange projection extending outwardly from said inner sleeve member underlying at least a portion of said outer sleeve member to engage the same for upward sliding movement when said cable is activated through said hand brake handle to apply the brake; and
    spring means associated with said brake cable coupling means to urge said inner sleeve member downward upon release of the hand brake handle.

* * * * *